US012781539B2

(12) United States Patent
Northfell et al.

(10) Patent No.: US 12,781,539 B2
(45) Date of Patent: Nov. 3, 2026

(54) BRACKET FORMING PART OF AN ARRANGEMENT OF A TIPPING-OVER-PREVENTION OF A CHEST OF DRAWERS, A DRAWER COMPRISING SUCH BRACKET AND A CHEST OF DRAWERS

(71) Applicant: Inter IKEA Systems B.V., LN Delft (NL)

(72) Inventors: Johan Northfell, Karlshamn (SE); Jan Lampei, Södra Sandby (SE)

(73) Assignee: Inter IKEA Systems B.V., Delft (NL)

( * ) Notice: Subject to any disclaimer, the term of this patent is extended or adjusted under 35 U.S.C. 154(b) by 50 days.

(21) Appl. No.: 18/868,341

(22) PCT Filed: May 24, 2023

(86) PCT No.: PCT/SE2023/050507

§ 371 (c)(1),
(2) Date: Nov. 22, 2024

(87) PCT Pub. No.: WO2023/229513

PCT Pub. Date: Nov. 30, 2023

(65) Prior Publication Data

US 2025/0338962 A1 Nov. 6, 2025

(30) Foreign Application Priority Data

May 25, 2022 (SE) .................................... 2250619-0

(51) Int. Cl.
*E05B 65/463* (2017.01)
*A47B 88/90* (2017.01)
*A47B 97/00* (2006.01)

(52) U.S. Cl.
CPC .......... *E05B 65/463* (2013.01); *A47B 88/941* (2017.01); *A47B 2088/902* (2017.01); *A47B 2097/008* (2013.01)

(58) Field of Classification Search
CPC . A47B 2097/008; A47B 88/941; A47B 88/50; A47B 2088/902; E05B 65/463; E05B 65/464
See application file for complete search history.

(56) References Cited

U.S. PATENT DOCUMENTS 4,429,930 A 2/1984 Blouin
4,480,883 A * 11/1984 Young .................. E05B 65/464 312/220

(Continued)

FOREIGN PATENT DOCUMENTS

DE 2748272 A1 5/1979
DE 3721833 A1 1/1989

(Continued)

*Primary Examiner* — Daniel J Rohrhoff
(74) *Attorney, Agent, or Firm* — Capitol City TechLaw

(57) ABSTRACT

A bracket may form part of an arrangement of a tipping-over-prevention of a chest of drawers. The bracket may include a body configured to be mounted to an exterior wall portion of a side panel of a drawer. The body may have a supporting portion and a locking portion arranged side by side as seen along a first longitudinal extension. The locking portion may be configured to receive a fastening means which is configured to extend through the locking portion and into an end edge of a rear panel of the drawer. The locking portion may include a locking protrusion extending along a second longitudinal extension transverse to the first longitudinal extension and being configured to receive a head of the fastening means. The bracket may be configured to be oriented such that the second longitudinal extension extends perpendicular to the end edge of the rear panel. The supporting portion may include an actuator pin configured to (Continued)

extend outwardly away from the exterior wall portion of the side panel.

22 Claims, 8 Drawing Sheets

(56) References Cited

U.S. PATENT DOCUMENTS

| | | | | |
|---|---|---|---|---|
| 4,768,844 | A * | 9/1988 | Ludwig | E05B 65/464 312/219 |
| 4,840,512 | A | 6/1989 | Rock et al. | |
| 5,056,877 | A | 10/1991 | Westwinkel | |
| 5,718,493 | A | 2/1998 | Nikolai | |
| 6,637,843 | B2 | 10/2003 | Westwinkel | |
| 9,962,826 | B1 | 5/2018 | Surridge | |
| 10,273,721 | B1 * | 4/2019 | Chen | E05B 63/143 |
| 2009/0015115 | A1 * | 1/2009 | Van Wijk | E05B 65/464 312/107 |
| 2010/0008744 | A1 * | 1/2010 | Tseng | F16B 12/2036 411/166 |
| 2013/0154463 | A1 | 6/2013 | Henscheid et al. | |
| 2018/0087551 | A1 * | 3/2018 | Chen | F16B 12/2009 |
| 2019/0003219 | A1 | 1/2019 | Doerflinger | |
| 2019/0365098 | A1 * | 12/2019 | Johannesson | E05B 65/46 |
| 2020/0352328 | A1 * | 11/2020 | Irgang | A47B 88/941 |
| 2022/0018635 | A1 * | 1/2022 | Ahle | F41H 5/14 |
| 2025/0019999 | A1 * | 1/2025 | Lampei | E05B 65/464 |
| 2025/0072604 | A1 * | 3/2025 | Lin | E05B 65/464 |
| 2025/0320754 | A1 * | 10/2025 | Taufik | A47B 88/45 |

FOREIGN PATENT DOCUMENTS

| | | | |
|---|---|---|---|
| EP | 0263364 | A1 | 4/1988 |
| EP | 1681399 | A2 | 7/2006 |
| EP | 2105063 | A1 | 9/2009 |
| WO | 2022132006 | A1 | 6/2022 |

* cited by examiner

BRACKET FORMING PART OF AN ARRANGEMENT OF A TIPPING-OVER-PREVENTION OF A CHEST OF DRAWERS, A DRAWER COMPRISING SUCH BRACKET AND A CHEST OF DRAWERS

This application claims priority under 35 USC 119(a)-(d) from SE patent application No. 2250619-0 filed on May 25, 2022, the entire contents of which are incorporated herein by reference.

TECHNICAL FIELD

The present invention refers to a bracket forming part of an arrangement of a tipping-over-prevention of a chest of drawers, a drawer comprising such bracket, and a chest of drawers comprising such drawer.

TECHNICAL BACKGROUND

A chest of drawers is a classical piece of furniture to store items in homes. The width and depth respectively of the chest of drawers is typically substantially smaller than the height. Thereby a large storing capacity is provided for while only requiring a limited footprint. Each drawer defines a storing volume and as a drawer is opened, the center of mass will be displaced. This is in most cases never a problem since the underlying working principle of a chest of drawers is to pull out drawers to get access to the contents. It is however never possible to foresee how a piece of furniture is used in practice and in the worst-case scenario, the chest of drawers may tip over and cause severe personal injuries. Typical risks are when the drawers at a higher level are filled with a heavy load and opened, or when a person is leaning over or seeks support against the chest or a pulled-out drawer. The latter may especially be the case when children are using the chest of drawers, either when trying to get access to its contents by climbing, or simply playing around.

As a safety measure it is well known to use brackets of different types to fixate the chest of drawers against a wall to thereby safeguard against any tipping over. However, even though the chest of drawers is delivered with brackets and the manual explicitly prescribe that the brackets should be mounted before taking the chest of drawers into use, the user frequently decides not to mount the brackets.

There are also solutions which prevent that more than one drawer is opened at a time. One such solution is disclosed in U.S. Pat. No. 4,768,844. In this locking system, each drawer is provided with an actuator pin, and also each drawer is configured, via a respective pivotable cam mechanism interacting with the actuator pin, to cause a longitudinal displacement of a respective locking bar which is received in a common guiding channel in a wall portion of the chest. The displacement of the one or more locking bars cause a compression of a common spring which is received in a gap having a fixed length. The fixed length of the gap is chosen to allow the displacement of one locking bar which displacement is required to open one drawer and which displacement is the result of the pivoting of one single drawer's cam mechanism. Thereby only one drawer at the time may be opened. As a result of the fixed length of the gap, the system has an inherent mechanical restriction that prevents two or more drawers from being opened at the same time.

It is however important from a user perspective that she can use the chest of drawers according to her own needs without being restricted to open one drawer at a time. From a safety perspective this must be made in a safe manner without the chest tipping over. The straightforward solution to overrule a locking system of the type given above and hence indirectly set the tipping over protection aside, is that the user either do not mount the actuator pin in the event the piece of furniture is of the type that is to be assembled by the user or removes the actuator pin. From a safety perspective any such initiatives are unacceptable and there is accordingly a need to find a solution which meets the issues mentioned above.

SUMMARY

An object of the present invention is to provide a bracket which is configured to form part of an arrangement of a tipping-over-prevention of a chest of drawers, that at least partly overcome the drawbacks and risks mentioned above.

More precisely, the bracket should have a design that makes it necessary to be mounted in order of allowing the chest of drawers to be properly used.

Another object is to provide a bracket that has a generic design that allows it to be used in a wide variety of different variants of a chest of drawers.

These and other objects are provided for by a bracket. The bracket forming part of an arrangement of a tipping-over-prevention of a chest of drawers. The bracket comprises a body having a supporting portion and a locking portion arranged side by side as seen along a first longitudinal extension. The body is configured to be mounted to an exterior wall portion of a side panel of a drawer.

The locking portion has a through-going opening configured to receive a fastening means. The fastening means may extend through the through-going opening of the locking portion and into an end edge of a rear panel of the drawer.

The locking portion comprises a locking protrusion extending along a second longitudinal extension transverse to the first longitudinal extension. The locking portion is configured to receive a head of the fastening means.

The bracket is configured to be oriented such that the second longitudinal extension extends perpendicular to the end edge of the rear panel.

The supporting portion comprises an actuator pin extending along the second longitudinal extension. Hence, the actuator pin extends outwardly away from the exterior wall portion of the side panel.

Accordingly, a bracket is provided which is to form part of an arrangement of a tipping-over-prevention of a chest of drawers. Arrangements for tipping-over-prevention are well known to the skilled person. As a common feature to such arrangements, each drawer is provided with an actuator pin that is configured to interact with a drawer locking arrangement to selectively allow only one drawer at a time to be opened. The invention resides in the idea of arranging the actuator pin on a bracket which constitutes an essential component to allow assembly of the drawer. More precisely, the bracket forming part of the invention is in addition to the actuator pin also provided with a locking portion that is configured to support the fastening means that is used to interconnect the side panel of the drawer with the rear panel. This ensures a correct mounting and use of the actuator pin when the drawer is assembled. This increases the likelihood of a correct use of the chest of drawers and hence reduces the risk of injuries caused by the chest of drawers tipping-over.

As yet another advantage, in the event the chest of drawers and its drawers are of the type which are configured to be assembled by the end-user, the components may be packed in flat containers without any projecting components.

The supporting portion of the bracket may in one embodiment have a first supporting protrusion having a substantially circular outer boundary portion. The first supporting portion may thereby be configured to be received in a fully or partially countersunk manner in a recess being formed in the exterior wall portion of a side panel of a drawer. By the circular boundary, the recess may be formed by drilling rather than by milling. Drilling requires a strict linear movement of the tool, while milling requires a movement of the tool across a surface. Thereby a very time efficient manufacturing process of the side panel is provided for. The recess is preferably arranged as a blind hole, i.e. as a non-throughgoing recess.

In one embodiment, the supporting portion may have a first supporting protrusion having a substantially circular outer boundary portion and a second supporting protrusion having a substantially circular outer boundary portion, the first and supporting protrusions being arranged side by side as seen along the first longitudinal extension, and wherein the first and second supporting protrusions are arranged either as discrete protrusions or as two protrusions partially merging with each other.

Thereby the first and second supporting protrusions may be configured to be received in a fully or partially countersunk manner in a recess being formed in the exterior wall portion of a side panel of a drawer where the recess is formed by drilling rather than milling. The two drilled recesses may be formed as discrete recesses, with one recess for each protrusion or be arranged in a partially overlapping position, i.e. with the recesses partially merging each other. Thereby a very time efficient manufacturing process of the side panel is provided for. Further, by the two supporting protrusions configured to be received in corresponding recesses in the side panel, the bracket may efficiently be prevented from be rotated during mounting.

The one or more recesses are preferably arranged as blind holes, i.e. as non-throughgoing recesses.

The locking portion may in one embodiment have a substantially circular outer boundary portion, the locking protrusion and the first supporting protrusion being arranged side by side as seen along the first longitudinal extension. Thereby the locking protrusion and the first supporting protrusion may be configured to be received in a fully or partially countersunk manner in a recess being formed in the exterior wall portion of a side panel of a drawer where the recess is formed by drilling rather than milling. The two drilled recesses may be formed as discrete recesses, with one recess for each protrusion or be arranged in a partially overlapping position, i.e. with the recesses partially merging each other.

The bracket may comprise a flexible tongue supporting the actuator pin.

Known arrangements providing a tipping-over-prevention typically comprises a rail with one locking member per drawer. The rail is mounted to one of the inner side walls of the cabinet which is arranged in parallel with the side wall of the drawer. When inserting the drawer for the first time into the cabinet, the actuator pin must be pushed past the rail. By arranging the actuator pin on a flexible tongue, this movement is facilitated since the tongue may be forced to temporarily flex inwardly to thereby allow the actuator pin to pass the rail.

The actuator pin is preferably arranged on the free end of the flexible tongue.

The actuator pin may in a free end thereof comprise a chamfering, said chamfering having an inclination sloping downwardly towards the locking portion.

The flexible tongue may in one embodiment be arranged in the first supporting protrusion. The flexible tongue may in another embodiment be arranged in the second supporting protrusion.

The position of the flexible tongue in the bracket is determined by the type of drawer to be used in the cabinet of the chest of drawers. The drawer can have what is known in the art as an inside drawer front or an outside drawer front. The length of the side panel differs between the two. However, by providing two types of brackets with different positions of the actuator pin, the actuator pin when supported by a drawer will always be arranged on the same position in view of a locking arrangement that is configured to be mounted in the chest of drawer and with which the actuator pin is intended to interact. This applies no matter if the specific drawer has an inside drawer front or an outside drawer front. Further, by providing two versions of the bracket with two different positions of the flexible tongue, the number of article numbers to monitor in a business system can be substantially reduced. More precisely, there is no need to make any changes to the cabinet, to the locking arrangement in the cabinet or to the side panels of the drawers depending on the type of drawer front, but only to provide two different brackets with two different positions of the flexible tongue and hence two different positions of the actuator pin.

The flexible tongue may comprise a free end portion facing away from the locking portion.

The locking portion of the connecting portion may in one embodiment of the bracket comprise a recess extending along the second longitudinal extension, thereby allowing the head of the fastening means to be countersunk in view of an exterior major surface of the body of the bracket as seen in a condition when the bracket is mounted to the side panel of the drawer.

A first major surface portion of the body extending across the first supporting portion may form an angle of 0.5-2 degrees in view of a second major surface portion of the body extending across the locking portion. By the angle, an inherent spring action is provided for when the bracket is mounted into the recesses in the wall portion of the side panel, which spring action will act towards maintaining the bracket in position.

The bracket may in one embodiment be mirror symmetric as seen in view of a virtual plane extending in the first and second longitudinal extensions. The bracket may thereby be mounted either to the left-side panel or to the right-side panel of an individual drawer, depending on if the locking arrangement is arranged on the left or right-hand side of the inner wall of the cabinet. Depending on the size of the drawers and the type of chest of drawers, each drawer may have brackets on both of its side panels or only on one of them.

According to another aspect of the invention, a drawer is provided. The drawer comprises a first and a second side panel, a rear panel extending between and having two opposing end edges abutting inner wall portions of the first and second side panels, and a bracket according to any of claims 1-9, the bracket being arranged on the exterior wall portion of one of the first and second side panels, and wherein a fastening means is arranged to extend through the locking portion of the bracket, through the one of the first or second side panels and into the end edge of the rear panel.

Accordingly, by the design of the bracket and its position on the side panel in view of the rear panel, it is made mandatory to use the bracket to allow a proper assembly of an individual drawer. Also, since the actuator pin is an integral part of the bracket, the likelihood of a correct use of the chest of drawers and its tipping-over-prevention is substantially increased, simply since the user cannot deliberately omit a mounting of the bracket with the actuator pin. Thereby, the risk of injuries caused by tipping-over is reduced.

The exterior wall portion of the one of the first and second side panels of the drawer may comprise a recess arrangement being configured to receive the supporting portion and the locking portion of the bracket. The recess may be complementary to the outer boundary of the rear side of the body.

One of the first and the second side panels or each of the first and the second side panels may in one embodiment comprise a recess arrangement, said recess arrangement comprising a first recess portion having a first circular boundary portion and a second recess portion having a second circular boundary portion, the first and second recess portions being arranged side by side as seen along the first longitudinal extension, either as discrete recesses or as recesses merging with each other.

The two recess portions may be formed by drilling. The two drilled recess portions may be formed as discrete recesses, with one recess portion for each protrusion of the bracket or be arranged in a partially overlapping position. Thereby a very time efficient manufacturing process of the side panel is provided for as compared to milling. Further, the recess arrangement with two recess portions ensures an intuitive mounting of the bracket and does also prevent displacement of the same during use.

The recess arrangement is preferably arranged as a blind hole, i.e. as a non-throughgoing recess.

The recess arrangement may further comprise a third recess portion having a substantially circular boundary portion, the third recess portion being arranged side by side with the first and second recess portions as seen along the first direction, either as discrete recesses or as recesses partially merging with each other. The first, second and third recesses are preferably formed by drilling.

According to yet another aspect, a chest of drawers is provided. The chest of drawers comprises at least two drawers as described according to the second aspect above; and a drawer locking arrangement comprising a longitudinally extending guiding rail connected to one inner side wall of the chest of drawers, said longitudinally extending guiding rail being provided with one pivotable locking member for each bracket. The locking arrangement also comprises a driver. The driver may be a driver in the form of a protrusion.

In one embodiment, the guiding rail is received in a vertically extending groove formed in the side wall of the chest of drawers.

In another embodiment, each locking member of the locking arrangement further comprises two fingers which between them define a gap. The gap is designed to receive the actuator protrusion of the bracket.

In yet another embodiment, the guiding rail of the locking arrangement further comprises a stop member arranged at an upper end portion of the guiding rail. The stop member has a spring compressible in view of the stop member at a predetermined distance. This distance is limited to allow only one drawer at the time to be opened. Since the spring is compressed to the predetermined distance when one drawer in the chest of drawers is opened, the remaining drawers are prevented from also being opened at the same time.

In a further embodiment, an upper edge portion of the respective locking member comprises a cam surface interacting with a cam shaped pusher. The upper most pusher in turn interacts with the spring, whereas the subsequent pushers are each indirectly interacting with spring via rods slidingly received in the guiding rail. This is beneficial since when pivoting any of the locking members below the upper most locking member, the rod or rods of the one or more locking members above the pivoted locking member, will be pushed upwardly to thereby act on the spring of the stop member to compress the same. As a result, the total compression length of the spring will be the same no matter which locking member is pivoted. By the limited allowed compression of the spring allowed by the stop member, only one drawer at the time is allowed to be opened.

Hence, each locking member selectively engages the actuator pin of the bracket on an associated drawer, and selectively allow only one drawer at a time to be opened.

The chest of drawers may in one embodiment further comprise an anchoring bracket, comprising a first bracket member and a second bracket member. The second bracket member is slidingly received in the first bracket member, whereby the second bracket member is movable in relation to the first bracket member between a first position and a second position. The first bracket member has a through-going opening and the second bracket member has a guiding slot comprising a first slot portion and a vertically extending second slot portion forming an angle to the first slot portion. The driver of the locking arrangement is received in the through-going opening and in the guiding slot. In the first position, the locking member engages the associated actuator pin of the bracket, and when the second bracket member is moved from the first position to the second position, the driver is displaced from the first slot portion to the second slot portion. As a result, the driver displaces the locking arrangement vertically causing each locking member to release the associated actuator pin. The anchoring bracket is hence configured to set the drawer locking arrangement into a passive mode when the second bracket member is moved to the second position, in which the chest of drawers may be anchored to a wall by using the anchoring bracket, in which passive mode a user is allowed to selectively open any drawer and any number of drawers at the same time.

In one embodiment, the guiding slot is V-shaped and the first slot portion has a longitudinal extension which coincides with a moving direction of the second bracket member in view of the first bracket member. The angle of the V-shapoed guiding slot may be varied in order to adjust the force needed to move the second bracket member in relation to the first bracket member.

In another embodiment, the anchoring bracket further comprises a mounting portion having a through-going hole. The hole may be used to anchor the anchoring bracket to a structure or wall using for instance a screw or another fastening means.

In a further aspect, there is provided a tipping-over-prevention system comprising a bracket, a locking arrangement, and an anchoring bracket. The bracket comprises a body having a supporting portion and a locking portion arranged side by side as seen along a first longitudinal extension. The locking portion comprises a through-going opening and a locking protrusion both extending along a second longitudinal extension transverse to the first longitudinal extension. The supporting portion comprises an actuator pin extending along the second longitudinal extension. The locking arrangement comprises a longitudinally extending guiding rail provided with one pivotable locking member for each bracket, and a driver. The anchoring bracket comprises a first bracket member and a second bracket member slidably received in the first bracket member whereby the second bracket member is movable in relation to the first bracket member between a first position and a second position. The first bracket member has a through-going opening and the second bracket member has a guiding slot comprising a first slot portion and a vertically extending second slot portion forming an angle to the first slot portion. The driver is received in the through-going opening and in the guiding slot. In the first position, the locking member engages associated actuator pin of the bracket. When the second bracket member is moved from the first position to the second position, the driver is displaced from the first slot portion to the second slot portion. This results in that the driver displaces the locking arrangement, and thus the locking members vertically, in turn causing each locking member to release the associated actuator pin.

This is advantageous in that the tipping-over-prevention system provides a solution where the engagement of the actuator protrusions of the brackets provided by the locking members is placed in a passive mode once the second bracket member is moved from the first position to the second position, in which the anchoring bracket may be anchored to a wall. Hence, the locking arrangement is activated before the anchoring bracket is attached to the wall, and prevents a user from opening more than one drawers at the time, thus preventing tipping over of a furniture in which the tipping-over-prevention system is arranged. Once the user has anchored the anchoring bracket to the wall, there is no longer any reason to prevent the user from opening several drawers at the same time.

In one embodiment, the bracket comprises a body being configured to be mounted to an exterior wall portion of a side panel of a drawer, said body having the supporting portion and the locking portion arranged side by side as seen along a first longitudinal extension. Thee locking portion is configured to receive a fastening means, the fastening means being configured to extend through the locking portion and into an end edge of a rear panel of the drawer. The locking portion comprises a locking protrusion extending along the second longitudinal extension transverse to the first longitudinal extension and being configured to receive a head of the fastening means. The bracket is configured to be oriented such that the second longitudinal extension extends perpendicular to the end edge of the rear panel. The supporting portion comprises the actuator pin extending along the second longitudinal extension outwardly away from the exterior wall portion of the side panel.

In a further aspect, there is provided a tipping-over-prevention system, comprising a bracket, a locking arrangement, and an anchoring bracket. The bracket and the locking arrangement selectively allow only one drawer of a chest of drawers to be opened at a time when the anchoring bracket is not anchored to a wall, and when the anchoring bracket is anchored to the wall any number of drawers may be opened at the same time.

In yet another aspect, there is provided a tipping-over-prevention method for a chest of drawers. The method comprising the steps of arranging a bracket on an exterior wall portion of one of a first and second side panels of a drawer, said bracket comprising a body having a supporting portion and a locking portion arranged side by side as seen along a first longitudinal extension, said locking portion comprising a through-going opening and a locking protrusion both extending along a second longitudinal extension transverse to the first longitudinal extension, and wherein the supporting portion comprises an actuator pin extending along the second longitudinal extension. The method then comprises the step of mounting a locking arrangement comprising a longitudinally extending guiding rail on an inner side wall of the chest of drawers. The locking arrangement is provided with one pivotable locking member for each bracket, and a driver. The method further comprises mounting an anchoring bracket fixedly to the inner side wall of the chest of drawers in a first position, said anchoring bracket comprising a first bracket member and a second bracket member slidably received in the first bracket member whereby the second bracket member is movable in relation to the first bracket member between the first position and a second position. The first bracket member has a through-going opening and the second bracket member has a guiding slot comprising a first slot portion and a vertically extending second slot portion forming an angle to the first slot portion.

Then, the method comprises arranging the anchoring bracket and the locking arrangement such that the driver is received in the through-going opening and in the guiding slot, and such that each locking member engages the actuator protrusion of the bracket, and moving the second bracket member from the first position to the second position. Finally, the method comprises anchoring the anchoring bracket to a structure.

This method is beneficial for the same reasons as described with reference to the tipping-over-prevention system above.

Further objects and advantages of the present invention will be obvious to a person skilled in the art reading the detailed description given below describing different embodiments.

BRIEF DESCRIPTION OF THE DRAWINGS

The invention will be described in detail with reference to the schematic drawings.

DETAILED DESCRIPTION

Figure 1A:
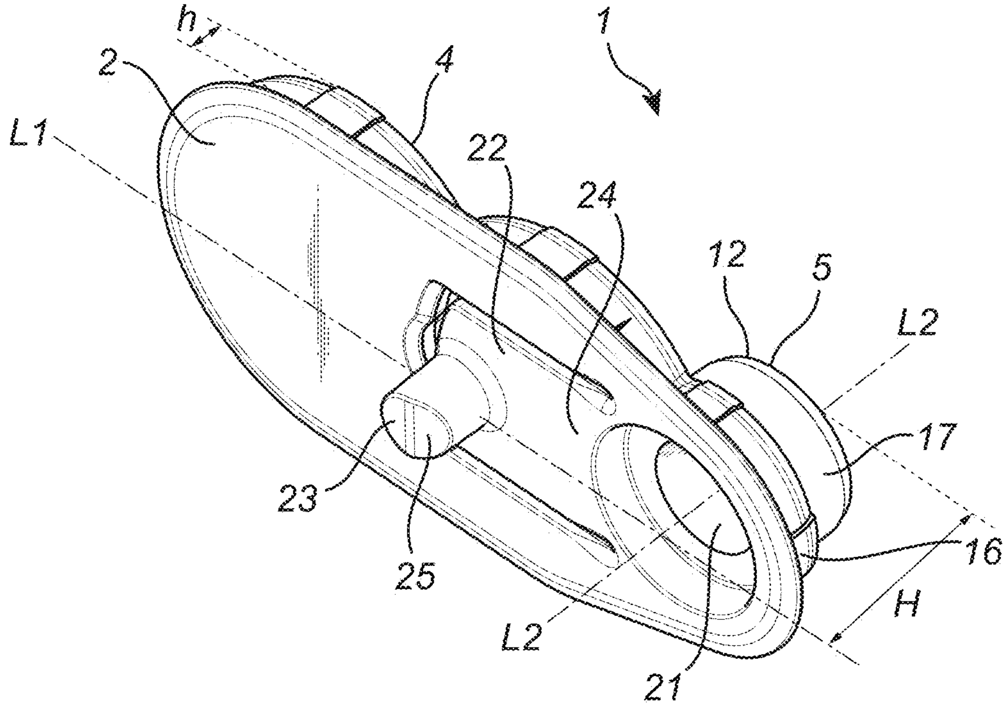
FIG. 1A is a first perspective view of a first embodiment of a bracket forming part of an arrangement of a tipping-over-prevention of a chest of drawers.
Figure 1B:
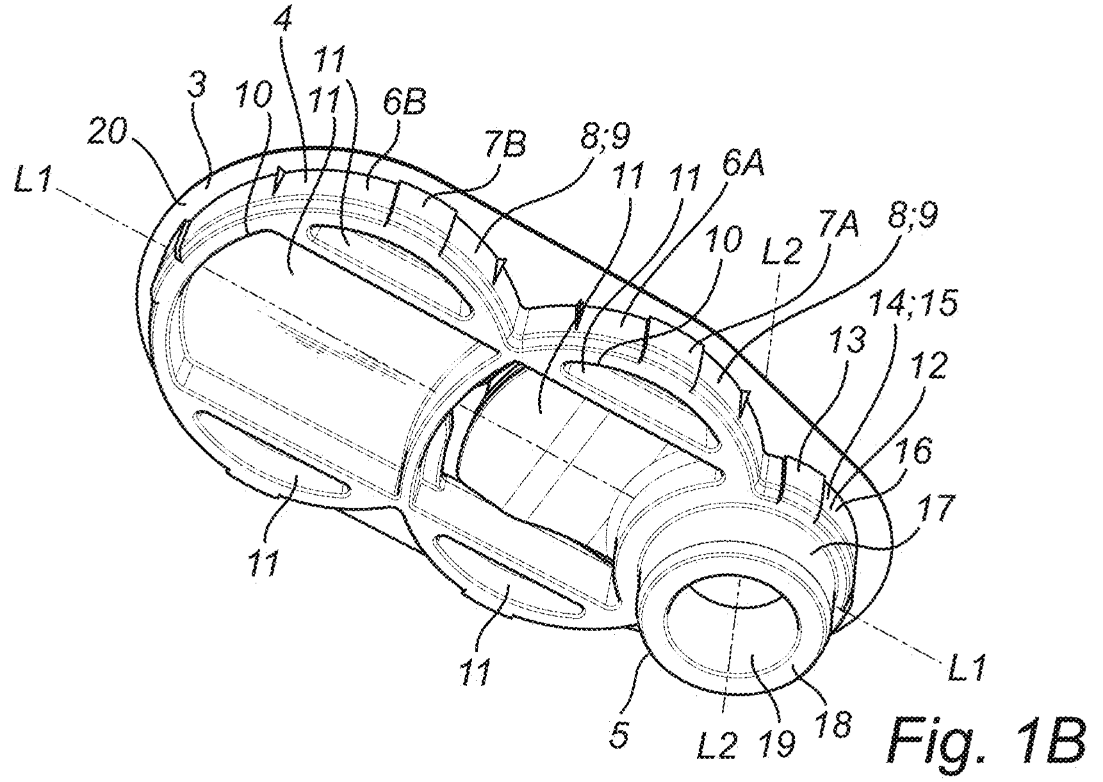
FIG. 1B is a second perspective view of the first embodiment of the bracket.

In the following a first embodiment of a bracket 1 forming part of an arrangement of a tipping-over-prevention of a chest of drawers according to the invention will be discussed with reference to FIGS. 1A and 1B respectively. FIG. 1A is a perspective view of the bracket 1 as seen from its upper major surface 2 configured to extend away from an exterior wall portion of a side panel of a drawer. FIG. 1B is a perspective view of the bracket 1 as seen from its lower major surface 3 configured to extend away from said exterior wall portion of the side panel.

As is best seen in FIG. 1B, the lower surface 3 of the bracket 1 comprises a supporting portion 4 and a locking portion 5. The supporting portion 4 and the locking portion 5 are arranged side by side as seen along a first longitudinal extension L1. The supporting portion 4 and the locking portion 5 respectively are configured to be received in corresponding recess portions of a recess arrangement that is formed in the exterior wall portion of the side panel as will be described below with reference to FIGS. 2A-2D.

The supporting portion 4 is divided into a first supporting protrusion 6A and a second supporting protrusion 6B. The bracket can with remained function comprise one supporting protrusion only or more than two supporting protrusions.

The first supporting protrusion 6A has a substantially circular outer boundary portion 7A. The second supporting protrusion 6B has a substantially circular outer boundary portion 7B. The first and second supporting protrusions 6A, 6B are arranged side by side as seen along the first longitudinal extension L1. Further, the first and second supporting protrusions 6A, 6B are partially merging with each other along a virtual overlapping portion that extends transverse to the first longitudinal extension L1. It is to be understood that the first and second supporting protrusions 6A, 6B with remained function may be arranged as two discrete protrusions. I.e., the first and second supporting protrusions 6A, 6B with remained function may be arranged as two individually separate and distinct protrusions.

An outer envelope surface 8 of each supporting protrusion 6A, 6B is provided with a plurality of optional radially extending indents 9. The purpose of these indents 9 is to save weight and material of the bracket 1. Further, an inner boundary 10 of each supporting protrusion 6A, 6B defines three cavities 11. The main purpose of these cavities 11 is to save weight and material of the bracket 1. Accordingly, the skilled person realizes that the outer envelope surface of each supporting protrusion 6A, 6B with remained function may be continuous. Further, the skilled person realizes that the design and the number of cavities 11 defined by the inner boundary 10 of each supporting protrusion 6A, 6B may vary with remained functionality.

The locking portion 5 comprises a locking protrusion 12 extending along a second longitudinal extension L2 transverse to the first longitudinal extension L1. The locking protrusion 12 and the first and second supporting protrusions 6A, 6B are arranged side by side as seen along the first longitudinal extension L1. Further, the first supporting protrusion 6A and the locking protrusion 12 are partially merging with each other along a virtual overlapping portion that extends transverse to the first longitudinal extension L1. It is to be understood that the first supporting protrusion 6A and the locking protrusion 12 with remained function may be arranged as two discrete protrusions. I.e., the first supporting protrusion 6A and the locking protrusion 12 with remained function may be arranged as two individually separate and distinct protrusions.

The locking protrusion 12 has a substantially circular outer boundary portion 13. An outer envelope surface 14 of the locking protrusion 12 is provided with a plurality of optional radially extending indents 15. The purpose of these indents 15 is to save weight and material of the bracket 1. The skilled person realizes that the outer envelope surface 14 of the locking protrusion 12 with remained function may be continuous.

Now turning to FIG. 1A. The locking protrusion 12 has a height H as seen along the second longitudinal extension L2 that exceeds the height h of the first and second supporting protrusions 6A, 6B respectively. The locking protrusion 12 is, as seen along the second longitudinal extension L2, divided into a first portion 16 and a second portion 17. The first portion 16 adjacent the lower surface of the bracket 1 is configured to be received in a through-going opening arranged in the side panel of the drawer. The second portion 17 is configured to be received in a recess formed in an end edge of a rear panel of the drawer. This will be further described below with reference to FIG. 2B. The first and second portions 16, 17 are disclosed as having different diameters, but the skilled person realizes that the dimeter may be the same. The outer diameter of the second portion 17 should be smaller than the wall thickness of the end edge of the rear panel of the drawer.

The second portion 17 of the locking protrusion 12 comprises a radially extending flange 18, see FIG. 1B, that defines a through-going opening 19. The opening 19 is configured to receive a fastening means to be described below, whereas the head of the fastening means is configured to abut the radially extending flange 18. Accordingly, the fastening means, such as a screw or bolt, is configured to be received in a recessed manned inside the locking protrusion 12.

The support portion 4 and the locking portion 5 are supported by the body of the bracket 1 which in turn forms a circumferential flange 20 that extends perpendicular to the second longitudinal extension L2. The flange 20 is configured to abut the exterior surface of the side panel of the drawer.

Now turning to the second side of the body of the bracket 1, best seen in FIG. 1A. The second side of the bracket 1 comprises a substantially flat major surface. This surface comprises a through-going opening 21 forming a mouth of the locking protrusion 12, thereby allowing a fastening means to be inserted into the locking protrusion 12 along the second longitudinal extension L2.

The second side of the body of the bracket 1 further comprises a flexible tongue 22 which on a free end thereof supports an actuator pin 23. The actuator pin 23 has an extension along the second longitudinal extension L2 and projects in a direction away from the supporting portion 4 and the locking portion 5 respectively. The flexible tongue 22 is connected to the bracket 1 via a flexing portion 24 having a longitudinal extension transverse to the first longitudinal extension L1. The actuator pin 23 may in a free end thereof comprise a chamfering 25. The chamfering 25 preferably has an inclination sloping towards the locking portion 5.

Figure 3A:
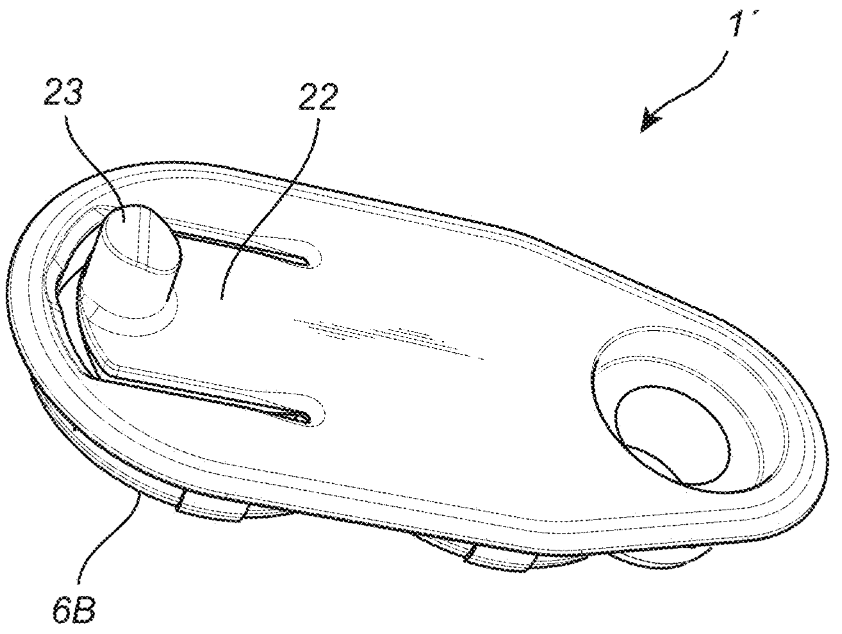
FIG. 3A is a first perspective view of a second embodiment of a bracket.
Figure 3B:
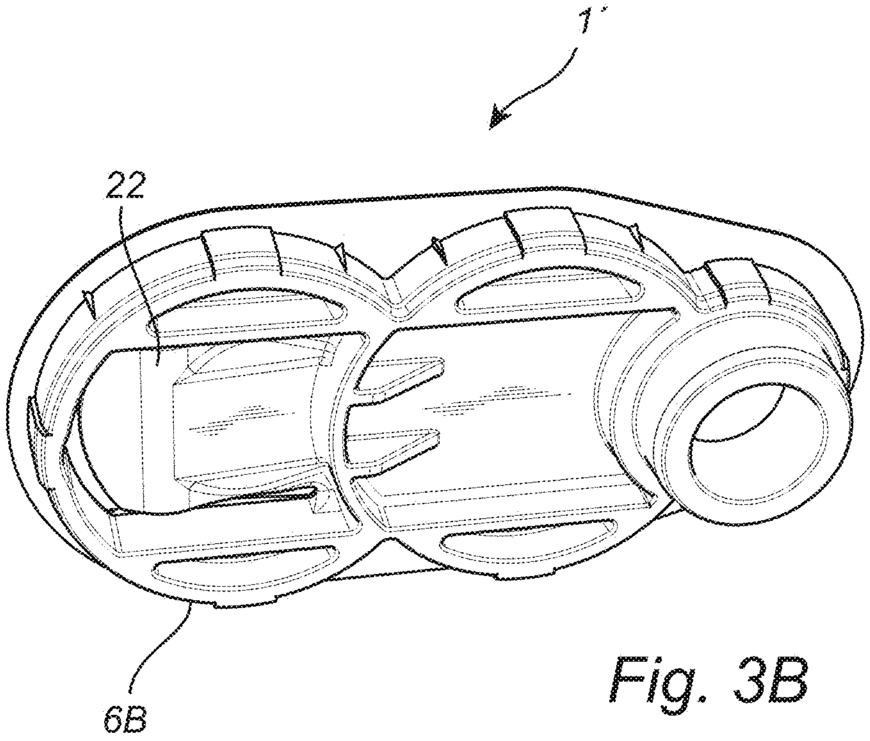
FIG. 3B is a second perspective view of the second embodiment of the bracket.

The flexible tongue 22 is in the disclosed embodiment of the bracket 1 arranged in the part of the body that is encircled by the boundary of the first supporting protrusion 6A. The flexible tongue 22 may in an alternative design of the bracket 1', best seen in FIGS. 3A and 3B, be arranged in the part of the body that is encircled by the boundary of the second supporting protrusion 6B.

The position of the flexible tongue 22 in the bracket 1 is determined by the type of drawer to be used in the cabinet of the chest of drawers. The drawer can have what is known in the art as an inside drawer front or an outside drawer front. The length of the side panel differs between the two types. However, by providing two types of brackets 1, 1' with different positions of the actuator pin 23, the actuator pin 23 when supported by a drawer will always be arranged on the same position in view of a locking arrangement that is configured to be mounted in the chest of drawer and with which the actuator pin 23 is intended to interact. This applies no matter if the specific drawer has an inside drawer front or an outside drawer front. Further, by providing two versions of the bracket with two different positions of the flexible tongue, the number of article numbers to monitor can be substantially reduced. More precisely, there is no need to make any changes to the cabinet, the locking arrangement in the cabinet or the side panels of the drawers depending on the type of drawer front, but only to provide two different brackets with two different positions of the flexible tongue and hence two different positions of the actuator pin.

Figure 1C:
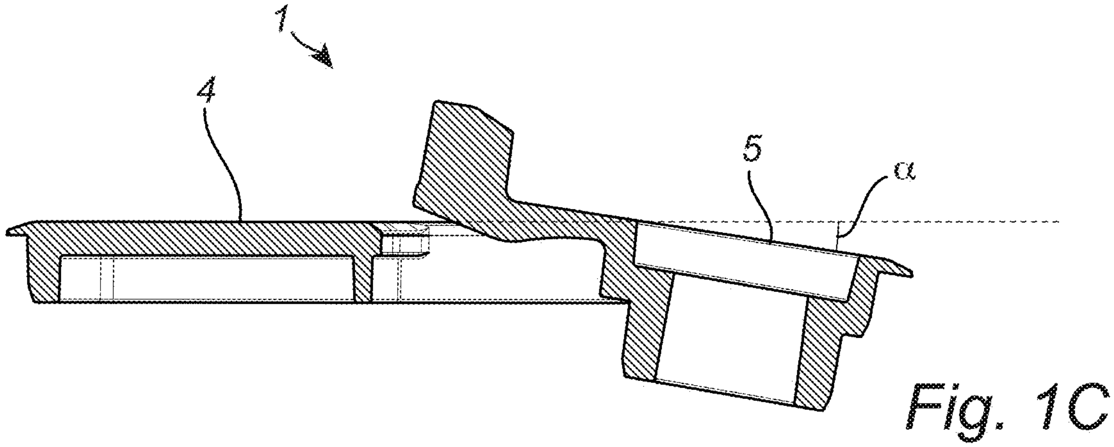
FIG. 1C is a highly schematic cross section of the bracket.

As is best seen in FIG. 1C, a first major surface portion of the upper major surface of the bracket 1 extending across the supporting portion 4 forms an angle α of 0.5-2 degrees in view of a second major surface portion of the upper major surface of the bracket 1 extending across the locking portion 5. By the angle α, an inherent spring action is provided for when the bracket 1 is mounted into the recesses in the wall portion of the side panel, which spring action will act towards maintaining the bracket 1 in position. The skilled person realizes that the angle with remained function may be omitted.

The bracket 1 may be mirror symmetric as seen in view of a virtual plane extending in the first and second longitudinal extensions L1, L2.

Now turning to FIGS. 2A-2D, the mounting of the bracket 1 to a drawer 100 will be described. Starting with FIGS. 2A and 2B, the drawer 100 comprises a front panel 101, two opposing side panels 102A, 102B and a rear panel 103. Further, the drawer 100 comprises a bottom wall 104. The rear panel 103 extends between and has two opposing end edges 105A, 105B abutting the inner wall portions 106A, 106B of the first and second side panels 102A, 102B. The two side panels 102A, 102B are identical whereby only one will be discussed below. Further, the two end edges 105A, 105B of the rear panel 103 are identical.

The exterior wall 107 of the side panel 102A comprises a recess arrangement 108 that is formed in a rear end portion of the side panel 102A. The recess arrangement 108, best seen in FIG. 2B, is configured to receive the supporting portion 4 and the locking portion 5 of the bracket 1. Accordingly, the recess arrangement 108 has a geometry that corresponds to the outer boundary portions 7A, 7B and 13 of the supporting portion 4 and the locking portion 5 of the bracket 1. Thus, the recess arrangement 108 comprises three circular recess portions 109A-109C that are partially merging with each other. The recess portion 109C configured to receive the locking portion 5 and hence the locking protrusion 12 of the bracket 1 is arranged in a position that is configured to overlap the end edge 105A of the rear panel 103.

The recess arrangement 108 has a depth being smaller than the material thickness of the side panel 102A. The depth is sufficiently large to allow the circumferential flange 20 of the bracket 1 to about the exterior wall 107 of the side panel 102A. Further, the recess portion 109C that is configured to receive the locking protrusion 12 of the bracket 1 is provided with a through-going opening 110 allowing insertion of a fastening means 111.

Figure 2A:
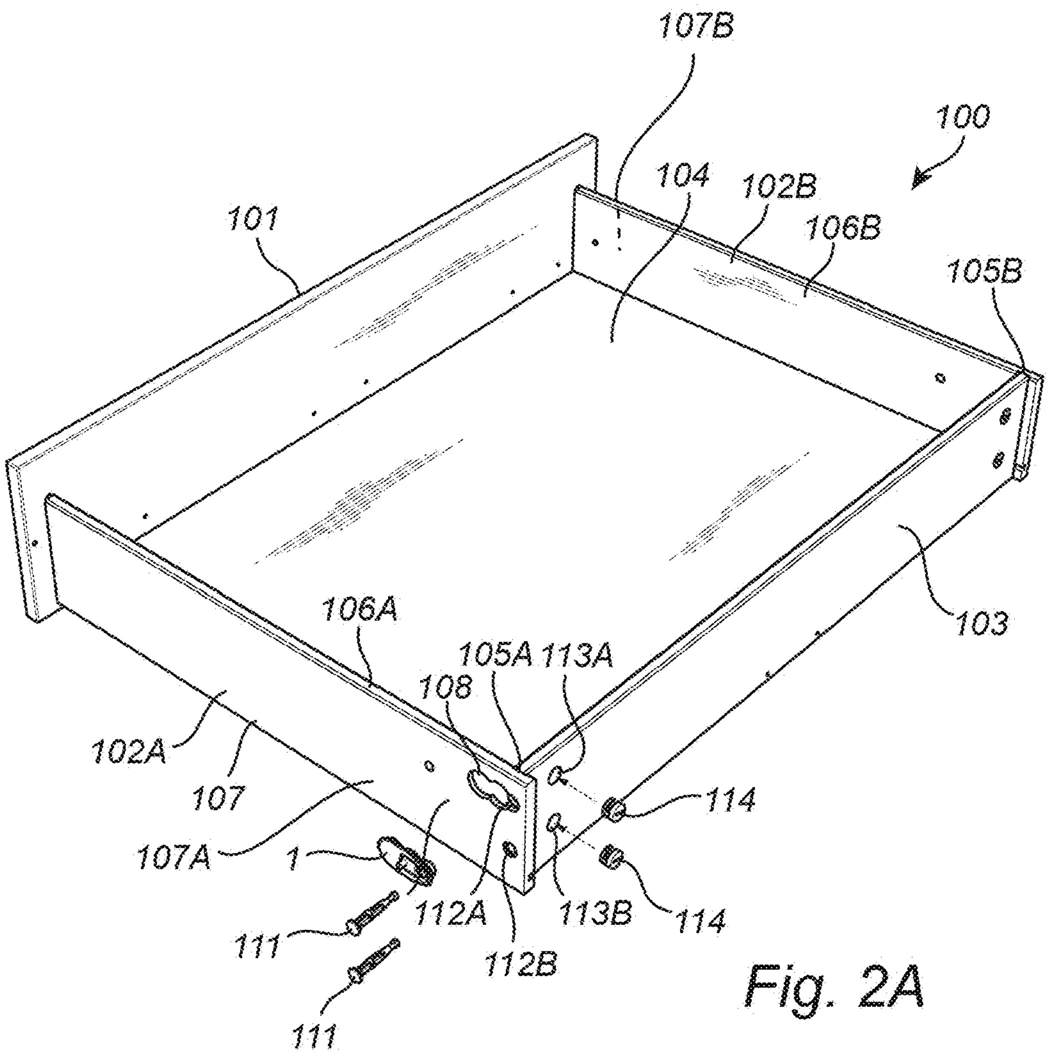
FIGS. 2A-2D are schematic views illustrating the acts of mounting a rear wall and the side walls of a drawer by using the bracket according to the invention.
Figure 2B:
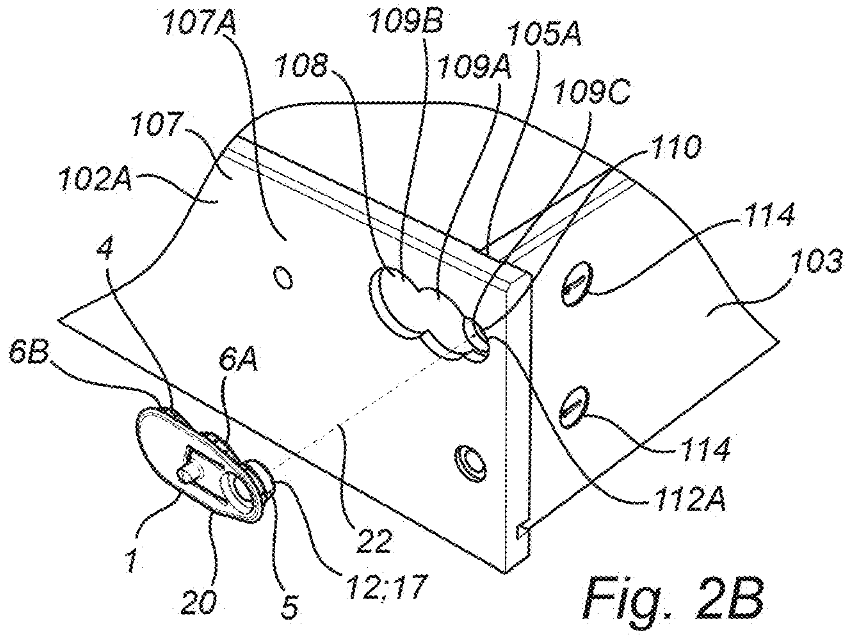

As is best seen in FIG. 2A, the end edge 105A of the rear panel 103 is provided with two sets of openings. A first set of openings comprises two holes 112A, 112B that extend into the rear panel 103 via its end edge 105A. A second set of openings comprises two holes 113A, 113B forming, non-through-going recesses, which extend from an exterior surface of the rear panel 103 and perpendicular to the major surface of the rear panel 103. The openings in the first and second sets of holes 112A, 112B, 113A, 113B are aligned to form an upper pair of mating channels (not illustrated) which meet inside the material of the rear panel 103 and a lower pair of channels (not illustrated) which meet inside the material of the rear panel 103. The upper pair of openings 112A, 113A are arranged in level with the center of the locking protrusion 12 of the bracket 1 and hence in level with the through-going opening 110 in the recess portion 109C. Thereby, a fastening means 111 may be inserted.

The upper opening 112A in the first set of openings that extend into the end edge 105A of the rear panel 103 preferably has a diameter that corresponds to the outer diameter of the second portion 17 of the locking protrusion 12, thereby allowing the second portion 17 to be received therein in a condition when the bracket 1 is mounted to the side panel 102A.

Figure 2C:
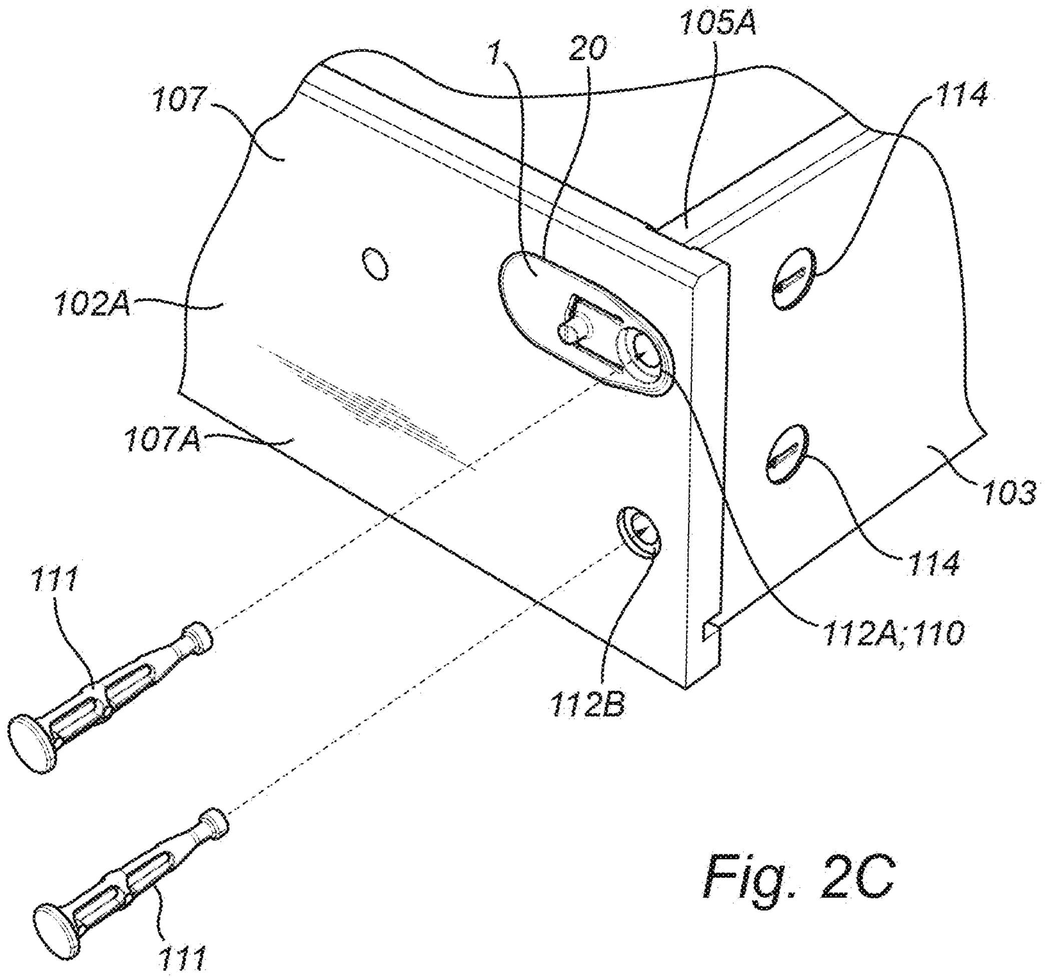

Now turning to FIGS. 2B and 2C. As a first step when mounting the side panel 102A to the rear panel 103, the bracket 1 is inserted into the recess arrangement 108 formed in the exterior wall 107 of the side panel 102A. This is made by moving the bracket 1 along the second longitudinal extension L2 into the recess arrangement 108 so that the supporting protrusions 6A, 6B and the locking protrusion 12 are received in the recess arrangement 108 while the circumferential flange 20 of the bracket 1 abuts the exterior wall 107 of the side panel 102A. Further, in this mounted position, the second portion 17 of the locking protrusion 12 is received in the hole 112A in upper pair of openings that extend into the end edge 105A of the rear panel 103.

A locking nut 114 is arranged in each of the openings of the second set of openings in the exterior surface of the rear panel 103. The locking nuts 114, which as such are well known in the art, are set to allow insertion of a free end of a fastening means 111 into engagement with an opening (not illustrated) in the locking nut 114.

As a next step, best seen in FIG. 2C, a fastening means 111 is inserted into each of the two openings 112A, 112B of the first set of openings in the rear panel 103. The upper fastening means 111 will accordingly be inserted through the through-going opening 21 in the bracket 1, into the upper opening 112A, into the end edge 105A of the rear panel 103 and further into engagement with the locking nut 114.

Figure 2D:
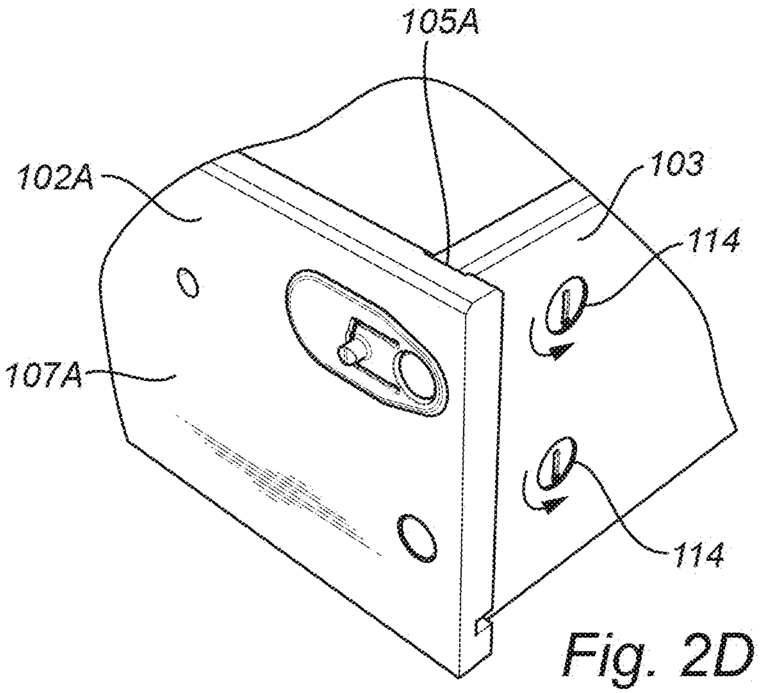

As a final step, best seen in FIG. 2D, the two locking nuts 114 are tensioned by being rotated 90 degrees with a suitable tooling (not illustrated). During this rotation of the locking nuts 114, the side panel 102A will be pulled into a locking engagement with the end edge 105A of the rear panel 103. This process is then repeated for the opposite side panel 102B of the drawer 100.

In the event of the upper major surface of the bracket 1 being provided with an angle α, the tensioning of the locking nuts 114 will elastically force the bracket into a substantially flat configuration in which the outer boundaries 7A, 7B of the supporting portion 4 will frictionally engage the corresponding inner boundaries of the recess arrangement 108.

Figure 4A:
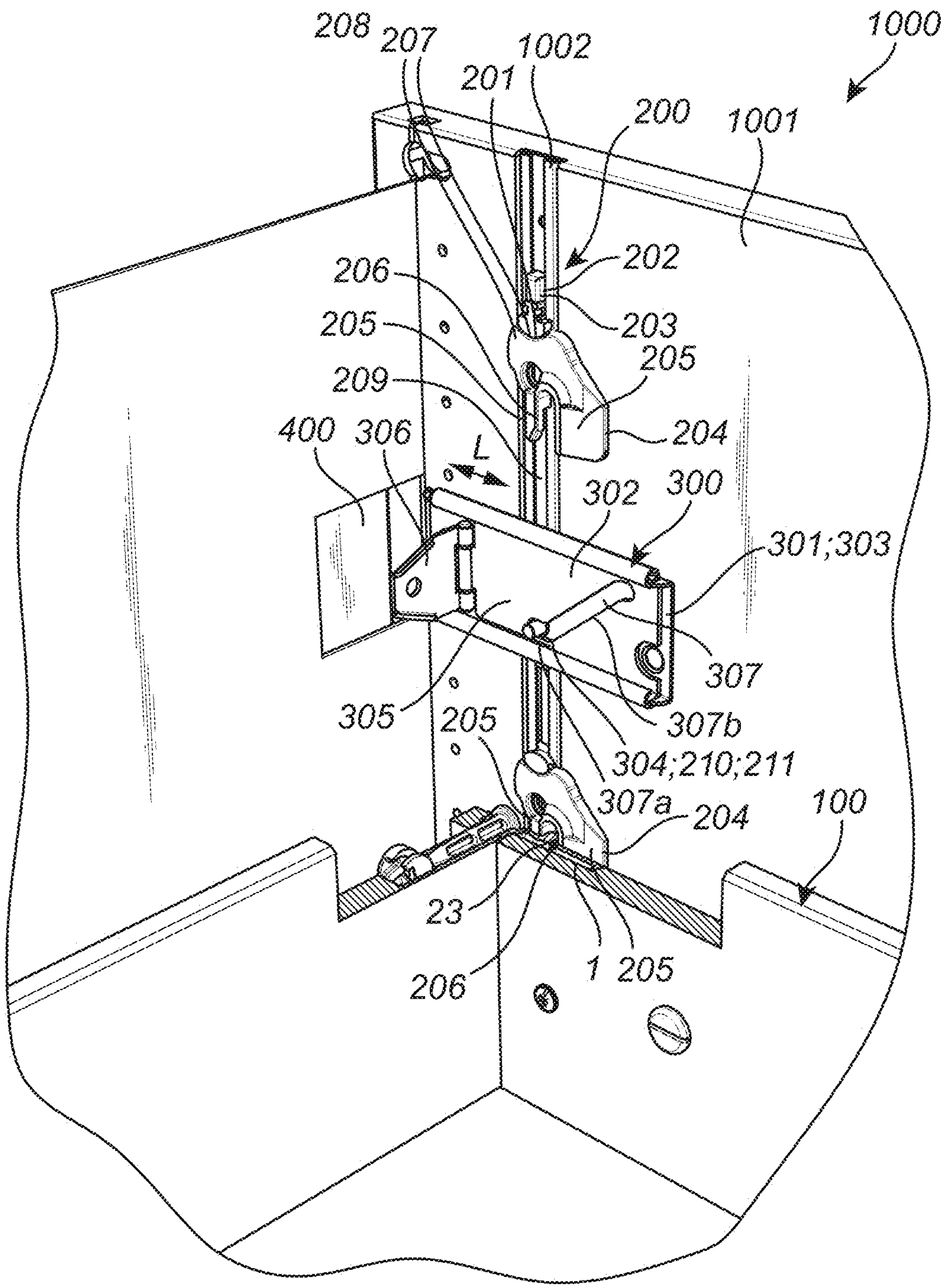
FIGS. 4A-4C schematically disclose the interaction between a drawer and one embodiment of a drawer locking arrangement before, during, and after anchoring the chest of drawers to a structure.
Figure 4B:
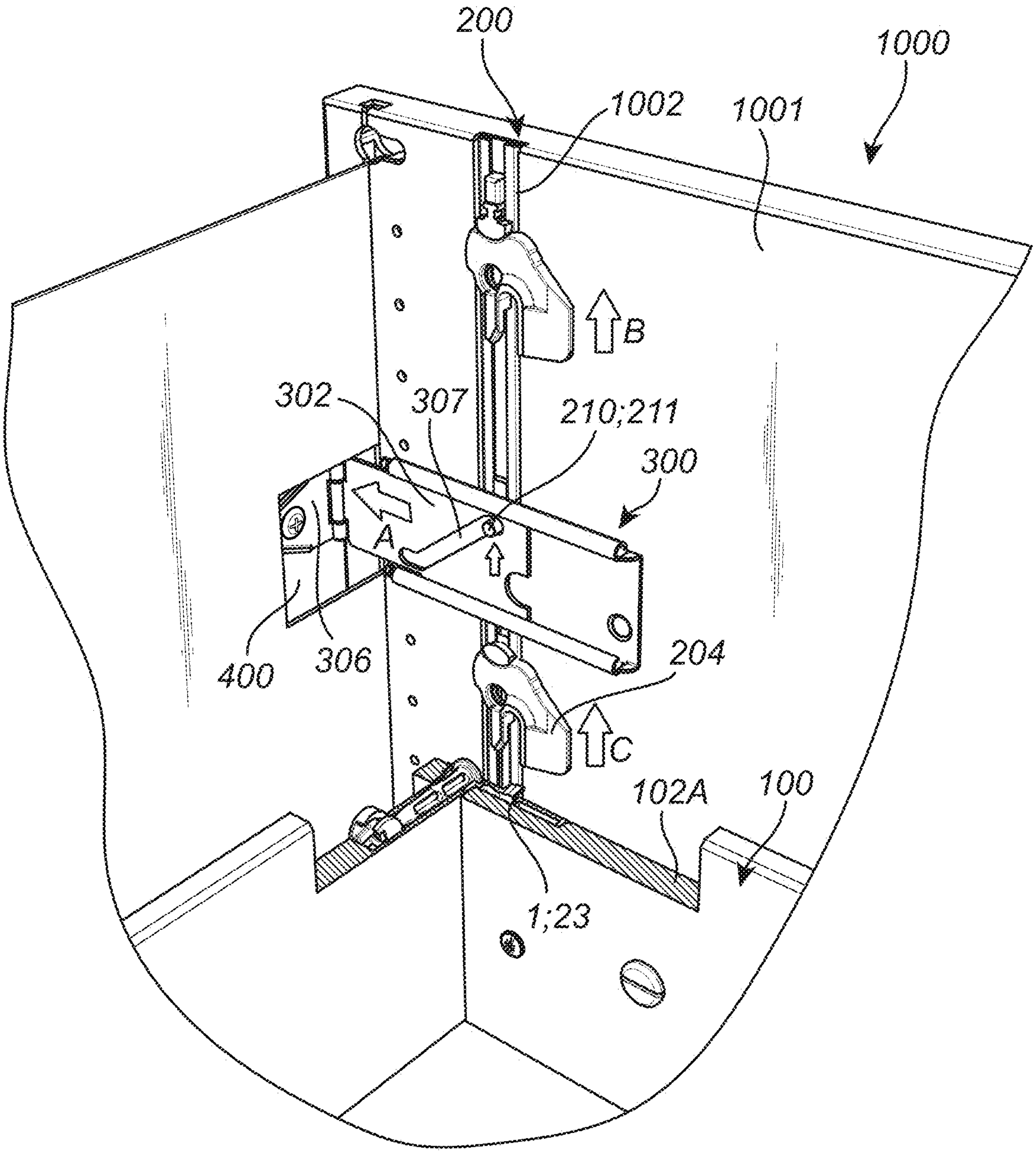
Figure 4C:
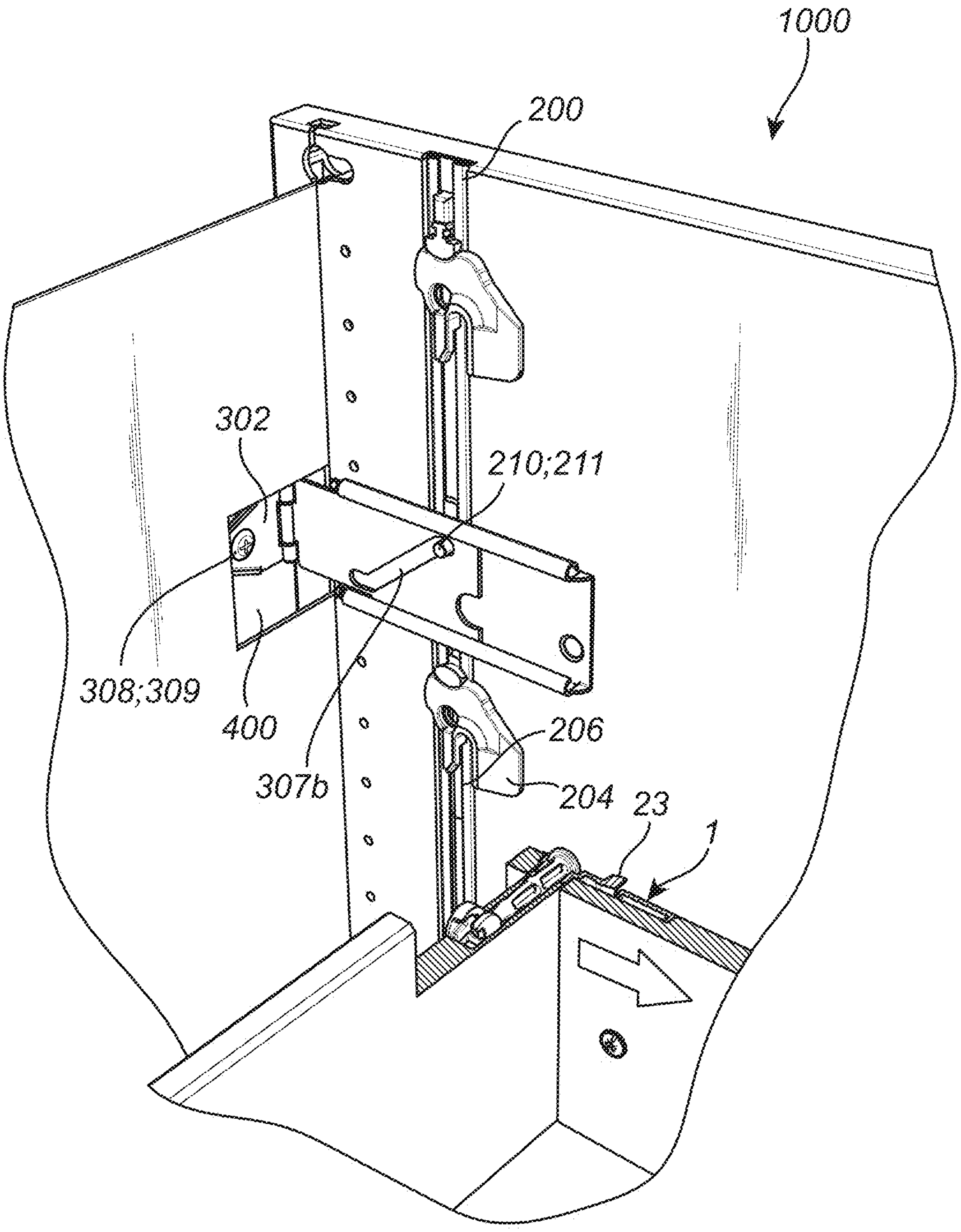

Now turning to FIGS. 4A-4C the interaction between the bracket 1 and one embodiment of an arrangement for a tipping-over-prevention is described. The arrangement for tipping-over-prevention comprises an anchoring bracket 300 and a drawer locking arrangement 200 which are connected to one inner side wall 1001 of a chest of drawers 1000. Although the arrangement for tipping over prevention will be exemplified as being applied to a chest of drawers, it is to be understood that the arrangement is equally applicable to other types of furniture with drawers where the center of gravity may be changed during use. Non-limiting examples are office furniture and file cabinets.

The anchoring bracket 300 comprises a first bracket member 301 and a second bracket member 302 which is slidably received in the first bracket member 301. The first bracket member 301 comprises a longitudinally extending body 303 which is configured to be fixedly mounted to the side wall 1001 the chest of drawers 1000. The side wall 1001 of the chest of drawers 1000 is preferably arranged to extend substantially perpendicular to a structure 400 separate from the chest of drawers 1000, such as a wall in a building or another furniture, to which the chest of drawers is to be anchored. The fixation of the first bracket member 301 to the side wall 1001 may be made by screws or the like.

The first bracket member 301 comprises a throughgoing opening 304 having a longitudinal extension extending perpendicular to the longitudinal extension L of the first bracket member 301. The throughgoing opening 304 is configured to receive a protrusion 211 of a driver 210 to be discussed below.

The second bracket member 302 comprises a guiding portion 305 and a mounting portion 306. Preferably, the mounting portion 306 extends perpendicularly from the guiding portion of the second bracket member 302. The mounting portion 306 may be pivotable in relation to the guiding portion 305. The second bracket member 302 is movable in relation to the first bracket member 301 between a first position and a second position, in which second position the second bracket member 302 is adapted to be anchored to the structure 400 being separate from the chest of drawers 1000.

The second bracket member 302 comprises a V-shaped guiding slot 307 which is arranged to receive the protrusion 211 of the driver 210 to be discussed below. The guiding slot 307 will together with the protrusion 211 of the driver 210 form a cam mechanism which will be discussed below.

The V-shaped guiding slot 307 comprises a first slot portion 307*a* which has a longitudinal extension which coincides with the moving direction of the second bracket member 302 in view of the first bracket element 301. Further, the V-shaped guiding slot 307 comprises a second slot portion 307*b* forming an angle to the first slot portion 307*a*. The angle between the two slot portions has an impact on the force that is required to move the second bracket member to its second position. The larger angle, the higher force is required.

The drawer locking arrangement 200 is as such a well-known arrangement in the furniture industry. The drawer locking arrangement 200 is described in detail in e.g. U.S. Pat. No. 4,768,844 which is included by reference. The drawer locking arrangement as described in said patent is originally developed to allow only one drawer at a time to be opened. Also, the drawer locking arrangement 200 is originally designed to be fixedly mounted to a side wall of a chest of drawers. In the present invention this is however not the case. Instead, the drawer locking arrangement 200 is according to the present invention slidingly mounted to the side wall 1001 of the chest of drawers 1000. In the disclosed embodiment, the drawer locking arrangement 200 is received in a vertically extending groove 1002 formed in the side wall 1001 of the chest of drawers 1000 as will be described below.

In the following the general working principle of the drawer locking arrangement 200 will be described. The drawer locking arrangement 200 comprises a longitudinally extending guiding rail 201 which is movable in view of the inner side wall 1001 of the chest of drawers 1000. This is accomplished by the guiding rail 201 being slidable received in the groove 1002 in the side wall 1001.

The guiding rail 201 comprises a stop member 202 which is arranged in an upper end portion of the guiding rail 201. The stop member 202 comprises a spring 203 that is compressible in view of the stop member 202 a pre-determined distance, which distance is limited to allow only one drawer at a time to be opened.

The guiding rail 201 further supports one locking member 204 per drawer 100 in the chest of drawers 1000. In the disclosed embodiment, the drawer locking arrangement 200 is configured to be used for a chest of drawers containing two drawers 100, and hence the guiding rail 201 supports two locking members 204. Each locking member 204 is pivotable supported by the drawer locking arrangement 200.

Each locking member 204 comprises two fingers 205 which between them define a gap 206 which is configured to receive the actuator pin 23 which is supported by bracket 1 forming part of the invention and that is mounted to the exterior side wall portion 107A of the respective drawer 100. In a position when the drawer 100 is closed, see FIG. 4A, the actuator pin 23 will be received in said gap 206. The actuator pin 23 is allowed to enter the gap 206 when the drawer 100 is first inserted by the inherent flexibility of the tongue 22.

When pulling the drawer 100 to open the same, the actuator pin 23 will cause the locking member 204 to pivot, whereby the engagement between the actuator pin 23 and the fingers 205 will be released, thereby allowing the drawer 100 to be pulled out.

An upper edge portion of the respective locking member 204 comprises a cam surface 207 which is configured to interact with a cam shaped pusher 208. In the disclosed embodiment, the upper most pusher 208 is arranged to interact with the spring 203 of the stop member 202, whereas the subsequent pushers 208 are each indirectly interacting with spring 203 of the stop member 202 via rods 209 which are slidingly received in the guiding rail 201. Thus, when pivoting any of the locking members 204 below the upper most locking member 204, the rod or rods 209 of the one or more locking members 204 above the pivoted locking member 204, will be pushed upwardly to thereby act on the spring 203 of the stop member 202 to compress the same. As a result of the cam mechanism between the respective pusher 208 and the cam surface 207, the total compression length of the spring 203 of the stop member 202 will be the same no matter which locking member 204 is pivoted. By the limited allowed compression of the spring 203 allowed by the stop member 202, only one drawer at the time is allowed to be opened.

The disclosed drawer locking arrangement 200 according to the present invention additionally differs from the prior art drawer locking arrangement in that it is provided with a driver 210 in the form of a protrusion 211. The driver 210 is fixedly arranged to the drawer locking arrangement 200.

As a result of the drawer locking arrangement 200 being slidably mounted to the inner side wall 1001 of the chest of drawers 1000, the complete drawer locking arrangement 200 will be displaced up and down along the groove 1002 by lifting the driver 210. Accordingly, by displacing the drawer locking arrangement 200 upwardly in the groove 1002 by lifting the driver 210 a distance that exceeds an engagement length of the fingers 205 of the respective locking member 204, the locking function of the drawer locking arrangement 200 will be set aside. Thus, the fingers 205 will no longer engage any actuator pin 23 of any drawer 100. Thereby any number of drawers may be selectively opened at the same time.

Now turning to FIG. 4A-4C the operation of the tipping over prevention will be explained. To facilitate understanding, only the inner, upper most corner of the chest of drawers 1000 is disclosed together with a portion of one drawer 100. A vertical side wall 102A of the drawer 100 is disclosed in cross section to better illustrate the cooperation between the drawer 100 and the locking member 204 of the drawer locking arrangement 200. The side wall 102A of each drawer 100 comprises a bracket 1 with an actuator pin 23 which projects away from the drawer 100 towards the locking member 204.

Starting with FIG. 4A, the drawer 100 is set to a fully closed position. The anchoring bracket 300 is fixedly mounted to the side wall 1001 of the chest of drawers 1000 and in view of the drawer locking arrangement 200. Also, the chest of drawers 1000 is not anchored to the structure 400 behind. The second bracket member 302 of the anchoring bracket 300 is thereby biased towards its first position and the protrusion 211 of the driver 210 is in a first driver position where it is received in the first slot portion 307*a* of the guiding slot 307. The drawer locking arrangement's ordinary operation is thereby not affected whereby the drawer locking arrangement 200 has its ordinary intended function allowing only one drawer 100 at a time to be opened. Hence, the stop member 202 with its spring 203 is in a position where the actuator pins 23 of the respective drawers 100 are received in the gaps 206 that are formed between the two fingers 205 of the respective locking members 204.

Now turning to FIG. 4B, the anchoring of the chest of drawers 1000 to the structure 400 has been initiated. This is made by displacing, see arrow A, the second bracket member 302 of the anchoring bracket 300 towards the structure 400. During this displacement, the protrusion 211 of the driver 210 will be forced by the guiding groove 307 of the anchoring bracket 300 to lift the whole drawer locking arrangement 200 along the longitudinal extension of the groove 1002 in the side wall 1001 of the chest of drawers 1000, see arrow B. Accordingly, this lifting, will also cause the locking member 204 of the drawer locking arrangement 200 to be displaced the same distance, see arrow C since it is part of the drawer locking arrangement 200.

The second bracket member 302, when set towards the second position to thereby anchor the chest of drawers 1000 will be moved in a direction transverse to a longitudinal extension of the guiding rail 201 of the drawer locking arrangement. Thus, while the drawer locking arrangement preferably has a vertical longitudinal extension along the side wall 1001 of the chest of the drawers 1000, the second bracket member 302 may be moved into a flat abutting relationship with the structure 400 to which it should be anchored.

Now turning to FIGS. 4C, the chest of drawers 1000 is mounted to the structure 400 by means of the second bracket member 302 of the anchoring bracket 300. This is made by a screw 308 engaging the structure 400 via a throughgoing hole 309 in the second bracket member 302. In this position, the second bracket member 302 has been displaced to such extent along the first bracket member 301 that the protrusion 211 of the driver 210 has been displaced along the second slot portion 307*b* into a second driver position. In this second driver position, the anchoring bracket 300 has displaced the complete drawer locking arrangement 200 in the vertical direction to such extent that the actuator pin 23 of the drawer 100 is no longer received in the gap 206 between the fingers of the locking member 204.

Since the anchoring bracket 300 has caused a vertical displacement of the whole drawer locking arrangement 200, the released engagement between the locking member and the actuator pin 23 applies not only to the disclosed drawer 100 but to all drawers in the chest of drawers. Thus, two or more or all drawers may now be selectively opened. Thus, the anchoring bracket 300 is set to its position in which the functionality of the drawer locking arrangement 200 is set aside allowing any drawer or any number of drawers to be selectively opened.

Hence, the actuator pin 23 is configured to be engaged by the locking arrangement 200 before the anchoring bracket 300 has been attached to the structure 400. The actuator pin 23 is received in the gap 206 of the locking arrangement 200 when the chest of drawers 1000 is unanchored to the structure 400. The actuator pin 23 is released from the gap 206 of the locking arrangement 200 when the chest of drawers 1000 is anchored to the structure 400. The actuator pin 23 of the bracket 1 is thus configured to be engaged by the drawer locking arrangement 200 which is connected to the inner side wall 1001 of the chest of drawers 1000, and the body of the bracket 1 is configured to be mounted to the exterior wall portion 107A, 107B of the side panel 102A, 102B of the drawer 100.

Accordingly, an arrangement for tipping over prevention of a chest of drawers is provided which, in a condition when the chest of drawers is anchored to a wall or another structural part, sets a drawer locking arrangement from an active mode to a passive mode. When the drawer locking arrangement is set into the active mode, only one drawer at a time is allowed to be selectively opened. When set into the passive mode, the user is allowed to selectively open any drawer and any number of drawers at the same time.

The arrangement for tipping over prevention has been exemplified as being applied to a chest of drawers. It is to be understood that the arrangement is equally applicable to other types of furniture with drawers where the center of gravity may be changed during use. Non-limiting examples are office furniture and file cabinets.

The invention claimed is:

1. A bracket comprising:

a body configured to be mounted to an exterior wall portion of a side panel of a drawer, the body having a supporting portion and a locking portion arranged side by side along a first longitudinal extension;

wherein the locking portion is configured to receive a fastening means, the fastening means being configured to extend through the locking portion and into an end edge of a rear panel of the drawer;

wherein the locking portion includes a locking protrusion extending along a second longitudinal extension that is transverse to the first longitudinal extension and being configured to receive a head of the fastening means;

wherein the bracket is configured to be oriented such that the second longitudinal extension extends perpendicular to the end edge of the rear panel; and wherein the supporting portion includes an actuator pin extending along the second longitudinal extension outwardly away from the exterior wall portion of the side panel.

2. The bracket according to claim 1, wherein the supporting portion has a first supporting protrusion having a substantially circular outer boundary portion.

3. The bracket according to claim 2, wherein the locking portion has a substantially circular outer boundary portion; and wherein the locking protrusion and the first supporting protrusion are arranged side by side along the first longitudinal extension.

4. The bracket according to claim 1, wherein the supporting portion has a first supporting protrusion having a substantially circular outer boundary portion and a second supporting protrusion having a substantially circular outer boundary portion, the first and the second supporting protrusions being arranged side by side along the first longitudinal extension; and wherein the first and the second supporting protrusions are arranged either as discrete protrusions or as two protrusions partially merging with each other.

5. The bracket according to claim 1, wherein the bracket comprises a flexible tongue supporting the actuator pin.

6. The bracket according to claim 5, wherein the flexible tongue is arranged in a first supporting protrusion or in a second supporting protrusion of the supporting portion.

7. The bracket according to claim 1, wherein the locking portion comprises a recess extending along the second longitudinal extension, thereby allowing the head of the fastening means to be countersunk relative to an exterior major surface of the body of the bracket in a condition when the bracket is mounted to the side panel of the drawer.

8. The bracket according to claim 1, wherein a first major surface portion of the body extending across the supporting portion forms an angle (α) of 0.5-2 degrees relative to a second major surface portion of the body extending across the locking portion.

9. The bracket according to claim 1, wherein the bracket is mirror symmetric relative to a virtual plane extending in the first and the second longitudinal extensions.

10. A drawer comprising:

a first and a second side panel;

a rear panel extending between and having two opposing end edges abutting inner wall portions of the first and the second side panels; and a bracket according to claim 1, the bracket being arranged on the exterior wall portion of one of the first and the second side panels;

wherein a fastening means is arranged to extend through the locking portion of the bracket, through the one of the first and the second side panels, and into the end edge of the rear panel.

11. The drawer according to claim 10, wherein the exterior wall portion of the one of the first and the second side panels comprises a recess arrangement configured to receive the supporting portion and the locking portion of the bracket.

12. A chest of drawers comprising:

at least two drawers according to claim 11; and a drawer locking arrangement having at least two locking members, each locking member being configured to selectively engage the actuator pin of a bracket on an associated drawer, and to selectively allow only one drawer at a time to be opened.

13. The chest of drawers according to claim 12, further comprising an anchoring bracket, the anchoring bracket being configured to set the drawer locking arrangement into a passive mode when the chest of drawers is anchored to a wall by using the anchoring bracket, in passive mode a user is allowed to selectively open any drawer and any number of drawers at the same time.

14. The drawer according to claim 10, wherein the one of the first and the second side panels or each of the first and the second side panels comprises a recess arrangement including a first recess portion having a first circular boundary portion and a second recess portion having a second circular boundary portion, the first and the second recess portions being arranged side by side along the first longitudinal extension, either as discrete recesses or as recesses merging with each other.

15. The drawer according to claim 14, wherein the recess arrangement further comprises a third recess portion having a substantially circular boundary portion, the third recess portion being arranged side by side with the first and the second recess portions along the first longitudinal extension, either as discrete recesses or as recesses partially merging with each other.

16. A tipping-over-prevention system, comprising:

a bracket, a locking arrangement, and an anchoring bracket;

wherein the bracket includes a body having a supporting portion and a locking portion arranged side by side along a first longitudinal extension;

wherein the locking portion includes a through-going opening and a locking protrusion both extending along a second longitudinal extension transverse to the first longitudinal extension;

wherein the supporting portion includes an actuator pin extending along the second longitudinal extension;

wherein the locking arrangement includes a longitudinally extending guiding rail provided with one pivotable locking member for each bracket; and a driver;

wherein the anchoring bracket includes a first bracket member and a second bracket member slidably received in the first bracket member whereby the second bracket member is movable in relation to the first bracket member between a first position and a second position;

wherein the first bracket member has a through-going opening and the second bracket member has a guiding slot with a first slot portion and a vertically extending second slot portion forming an angle to the first slot portion;

wherein the driver is received in the through-going opening and in the guiding slot;

wherein in the first position, the locking member engages an associated actuator pin of the bracket; and wherein when the second bracket member is moved from the first position to the second position, the driver is displaced from the first slot portion to the second slot portion.

17. The tipping-over-prevention system according to claim 16, wherein the guiding slot is V-shaped and the first slot portion has a longitudinal extension which coincides with a moving direction of the second bracket member relative to the first bracket member.

18. The tipping-over-prevention system according to claim 16, wherein the anchoring bracket further comprises a mounting portion having a through-going hole.

19. The tipping-over-prevention system according to claim 16, wherein each locking member of the locking arrangement further comprises two fingers which between them define a gap.

20. The tipping-over-prevention system according to claim 16, wherein the guiding rail of the locking arrangement further comprises a stop member arranged at an upper end portion of the guiding rail, the stop member comprising a spring compressible in view of the stop member at a predetermined distance.

21. The tipping-over-prevention system according to claim 20, wherein an upper edge portion of the respective locking member comprises a cam surface interacting with a cam shaped pusher;

wherein an upper most pusher interacts with the spring, whereas subsequent pushers are each indirectly interacting with the spring via rods slidingly received in the guiding rail.

22. A tipping-over-prevention method for a chest of drawers, the method comprising:

arranging a bracket on an exterior wall portion of one of a first and a second side panel of a drawer, the bracket including a body having a supporting portion and a locking portion arranged side by side along a first longitudinal extension, the locking portion including a through-going opening and a locking protrusion both extending along a second longitudinal extension transverse to the first longitudinal extension, and wherein the supporting portion includes an actuator pin extending along the second longitudinal extension;

mounting a locking arrangement including a longitudinally extending guiding rail on an inner side wall of the chest of drawers, the locking arrangement being provided with one pivotable locking member for each bracket, and a driver;

mounting an anchoring bracket fixedly to the inner side wall of the chest of drawers in a first position, the anchoring bracket including a first bracket member and a second bracket member slidably received in the first bracket member whereby the second bracket member is movable in relation to the first bracket member between the first position and a second position, wherein the first bracket member has a through-going opening and the second bracket member has a guiding slot with a first slot portion and a vertically extending second slot portion forming an angle to the first slot portion;

arranging the anchoring bracket and the locking arrangement such that the driver is received in the through-going opening and in the guiding slot, and such that each locking member engages the actuator protrusion of the bracket;

moving the second bracket member from the first position to the second position; and anchoring the anchoring bracket to a structure.

* * * * *